(12) United States Patent
Carvounas et al.

(10) Patent No.: US 9,767,303 B2
(45) Date of Patent: *Sep. 19, 2017

(54) AUTHENTICATED MEMORY AND CONTROLLER SLAVE

(71) Applicant: MONTEREY RESEARCH, LLC, Santa Clara, CA (US)

(72) Inventors: Christophe Carvounas, Le Plessis Trevise (FR); Joël LeBihan, Nantes (FR)

(73) Assignee: MONTEREY RESEARCH, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/180,444

(22) Filed: Feb. 14, 2014

(65) Prior Publication Data

US 2014/0165217 A1 Jun. 12, 2014

Related U.S. Application Data

(63) Continuation of application No. 11/963,538, filed on Dec. 21, 2007, now Pat. No. 8,694,776.

(51) Int. Cl.
*H04L 9/32* (2006.01)
*G06F 12/14* (2006.01)
(Continued)

(52) U.S. Cl.
CPC ........ *G06F 21/6218* (2013.01); *G06F 21/445* (2013.01); *G06F 2221/2129* (2013.01)

(58) Field of Classification Search
CPC ................. G06F 21/6209; G06F 21/77; G06F 2221/2143; G06F 21/6218; G06F 21/445;
(Continued)

(56) References Cited

U.S. PATENT DOCUMENTS 6,141,705 A 10/2000 Anand et al.
6,370,599 B1 4/2002 Anand et al.
(Continued)

OTHER PUBLICATIONS

Office Action for U.S. Appl. No. 11/963,538 mailed on Dec. 10, 2010, 25 pages.
(Continued)

*Primary Examiner* — Saleh Najjar
*Assistant Examiner* — Feliciano Mejia
(74) *Attorney, Agent, or Firm* — Kunzler Law Group, PC

(57) ABSTRACT

Systems and methods that can facilitate the utilization of a memory as a slave to a host are presented. The host and memory can provide authentication information to each other and respective rights can be granted based in part on the respective authentication information. The host can determine the available functionality of the memory. The host can activate the desired functionality in the memory and can request memory to perform the desired function(s) with regard to data stored in the memory. An optimized controller component in the memory can facilitate performing the desired function(s) associated with the data to generate a result. The result can be provided to the host, while the data and associated information utilized to generate the result can remain in the memory and are cannot be accessed by the host.

20 Claims, 9 Drawing Sheets

(51) Int. Cl.
*G06F 21/62* (2013.01)
*G06F 21/44* (2013.01)

(58) Field of Classification Search
CPC .......... G06F 2221/2129; G06Q 20/341; G06Q 20/35765
USPC ..... 235/382, 492; 704/63, 65; 711/103, 155, 711/159; 713/169, 150, 168, 193, 194
See application file for complete search history.

(56) References Cited

U.S. PATENT DOCUMENTS

| | | | |
|---|---|---|---|
| 6,945,454 B2* | 9/2005 | Tournemille et al. | ........ 235/375 |
| 7,303,135 B2* | 12/2007 | Nakabe et al. | ............... 235/492 |
| 7,389,937 B2 | 6/2008 | Ito | |
| 7,526,625 B2* | 4/2009 | Ebara et al. | .................. 711/163 |
| 7,581,099 B2 | 8/2009 | Ong | |
| 7,590,242 B2* | 9/2009 | Genevois | ............ H04L 63/0428 370/473 |
| 7,620,746 B2 | 11/2009 | Go et al. | |
| 7,712,131 B1* | 5/2010 | Lethe | .............................. 726/20 |
| 7,739,724 B2* | 6/2010 | Durham | .............. H04L 63/0209 713/193 |
| 7,748,031 B2 | 6/2010 | Gonzalez et al. | |
| 7,873,837 B1 | 1/2011 | Lee et al. | |
| 7,966,039 B2 | 6/2011 | Sadovsky et al. | |
| 8,132,018 B2 | 3/2012 | Eldar et al. | |
| 2004/0139021 A1 | 7/2004 | Reed et al. | |
| 2006/0161725 A1 | 7/2006 | Lee et al. | |
| 2006/0242064 A1* | 10/2006 | Jogand-Coulomb et al. | .. 705/50 |
| 2008/0022395 A1 | 1/2008 | Holtzman et al. | |
| 2010/0023777 A1 | 1/2010 | Prevost et al. | |

OTHER PUBLICATIONS

Final Office Action for U.S. Appl. No. 11/963,538 mailed on May 27, 2011, 23 pages.
Office Action for U.S. Appl. No. 11/963,538 mailed on Sep. 27, 2012, 32 pages.
Dolgunov, B., "Enabling Optimal Security for Removable Storage Devices", Security in Storage Workshop, 2007. SISW'07. Fourth International IEEE Sep. 27-27, 2007, pp. 15-21 [retrieved from IEEE database on Sep. 23, 2012].
Final Office Action for U.S. Appl. No. 11/963,538 mailed on May 16, 2013, 29 pages.
USPTO Notice of Allowance for U.S. Appl. No. 11/963,538 dated Nov. 15, 2013; 12 pages.

* cited by examiner

AUTHENTICATED MEMORY AND CONTROLLER SLAVE

CROSS-REFERENCE TO RELATED APPLICATIONS

This application is a Continuation of application Ser. No. 11/963,538 filed Dec. 21, 2007, the entire contents of which is hereby incorporated by reference.

TECHNICAL FIELD

The subject innovation relates generally to memory systems and in particular, to systems and methodologies that can facilitate the utilization of a memory module as a slave device that can operate in response to instructions and data received from an external processor.

BACKGROUND

A wide variety of memory devices can be used to maintain and store data and instructions for various computers and similar systems. In particular, flash memory is a type of electronic memory media that can be rewritten and retain content without consumption of power. Unlike dynamic random access memory (DRAM) devices and static random memory (SRAM) devices in which a single byte can be erased, flash memory devices are typically erased in fixed multi-bit blocks or sectors. Flash memory technology can include NOR flash and/or NAND flash, for example. NOR flash evolved from electrically erasable read only memory (EEPROM) chip technology, in which, unlike flash, a single byte can be erased; and NAND flash evolved from DRAM technology. Flash memory devices can be less expensive and denser as compared to many other memory devices, meaning that flash memory devices can store more data per unit area.

Flash memory has become popular, at least in part, because it combines the advantages of the high density and low cost of EPROM with the electrical erasability of EEPROM. Flash memory can be used in many portable electronic products, such as cellular phones; computers, voice recorders, thumbnail drives, and the like, as well as in many larger electronic systems, such as automobiles, airplanes, industrial control systems, etc. The fact that flash memory can be rewritten as well as its retention of data without a power source, small size and light weight have all combined to make flash memory devices a useful and popular means for transporting and maintaining data.

Conventionally, memory devices, such as a flash memory device, are utilized for data storage, where a microcontroller can facilitate managing access to the memory as well as storage and retrieval of data. Sensitive information (e.g., personal information, financial information, confidential information, etc.) can be stored in the memory, and a user can desire a heightened level of security with regard to accessing the data and/or providing the data. Typically, a host processor can receive data from the memory device and can process and/or display the data, as desired by the host processor. However, with regard to certain sensitive information, a user can desire that certain sensitive information be secure from access by the host processor to facilitate securing the data or the processing of such data. It is desirable to extend the functionality of the memory devices to improve the security of the data associated with the memory as well as to reduce the workload of the host processor.

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

The disclosed subject matter relates to systems and/or methods that facilitate employing a memory component (e.g., memory device) as a slave with respect to a host. In one aspect, the memory component can be employed to perform certain tasks or functions that conventionally would be performed by a host. The memory component can act as a peer with respect to the host.

In one aspect, employing a protocol, the memory component and a host can identify and/or authenticate with respect to each other. The memory component can be queried by host regarding the tasks, functions, and/or operations that the memory component can perform, and the memory component can provide to the host information relating to the tasks, functions, and/or operations (e.g., cryptographic functions, authentication functions, printing functions, searching for sensitive information, searching for e-mails, functions related to a set-top box, etc.) that the memory component can perform. Based in part on the level of authentication, the available functionality of the memory component, and/or the level of sensitivity of the data stored in the memory component, the host can offload specified tasks, functions, and/or operations to the memory component, and the memory component can act as a slave with respect to the host, and the memory component can perform such tasks, functions, and/or operations, which can be related to data (e.g., sensitive information) stored in the memory component. The memory component can provide a result(s) to the host, without providing the host the data, but rather only providing the host the result(s) based in part on the task performed by the memory component. In accordance with another aspect, the memory component and the host each can clean their respective environment, so that no data (e.g., sensitive information) remains after the task, function, and/or operation is completed.

As a result, the processor component of the host can remain free to perform other functions or tasks, while the memory component performs specified tasks, functions, and/or operations. As further result, information associated with the memory component, such as sensitive information, can be secured in the memory component, and the memory component can perform certain tasks, functions, and/or operations on such information in a secure environment, and can provide a result to the host related to such information without providing the information itself and/or other data related to such sensitive information.

In accordance with still another aspect, methods that can facilitate offloading certain tasks and/or functions from a host to a memory component are presented. In yet another aspect, electronic devices that can comprise a memory component that can perform tasks, functions, and/or operations offloaded from a host, in accordance with the disclosed subject matter, are presented.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Figure 1:
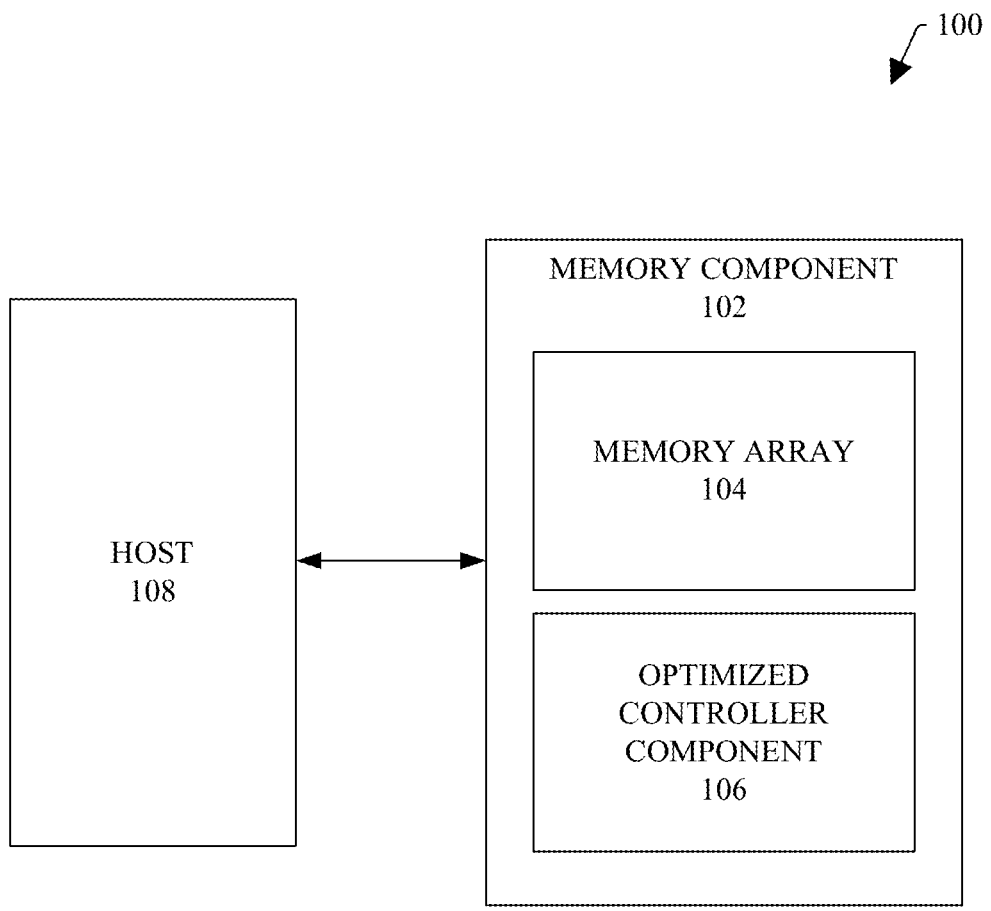
FIG. 1 illustrates a block diagram of a system that can facilitate utilization of a memory component as a slave associated with a host in accordance with an aspect of the subject matter disclosed herein.

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram form in order to facilitate describing the subject innovation.

Conventionally, a memory device performs limited functions, such as storing, retrieving, and providing data associated with the memory device. A user can store sensitive information in the memory device that the user desires to be secured in the memory device such that the sensitive information is not provided and/or stored (e.g., permanently stored) elsewhere, such as a host. Typically, the host can request data and can process data, such as for presentation in a user interface. It can be desirable to offload certain tasks, functions, and/or operations to the memory so that the memory can execute the tasks, functions, and/or operation on the data, such as sensitive data, and can provide a result to the host without providing the host with the data or associated data that can be associated with the result, where the result can be provided to non-persistent memory associated with the host, where the host can present the result, but the host does not permanently store the result, and the host cannot access the data (or associated data) contained in the memory that was utilized to produce the result, thereby securing the data stored in the memory.

Systems, devices, and methods are presented that can facilitate employing a memory component (e.g., flash memory device) as a slave while communicatively connected to a host. While acting as a slave, the memory component can receive data, instructions, information, etc., from the host related to a task(s), function(s), and/or operation(s) the host is offloading to the memory component, and the memory component can perform such task(s), function(s), and/or operation(s), and can transmit a result(s) associated therewith to the host, which can utilize the result(s) as desired (e.g., display the result(s) in a user interface). The transmitted result(s) can be such that the result(s) is stored in volatile memory associated with the host and does not have to be saved by the host. The memory component and host can "clean" their respective environments such that information related to a task, function, or operation remains available after such is performed and the result(s) has been utilized, as desired, by the host (e.g., the result(s) is not saved to a hard drive associated with the host). The subject innovation can thereby enable tasks, functions, and/or operations to be performed in a secure environment in the memory component without certain sensitive information (e.g., confidential information, personal information, etc.) being provided to the host or other entities.

Turning to FIG. 1, illustrated is a system 100 that can facilitate utilization of a memory component as a slave associated with a host in accordance with an aspect of the subject matter disclosed herein. System 100 can include a memory component 102 that can be comprised of a memory array(s) 104 that can store data, operation code, commands, etc., in individual memory locations (e.g., memory cells) within the memory array 104. In accordance with an aspect, the memory component 102 can comprise non-volatile memory (e.g., flash memory) and/or volatile memory (e.g., static random access memory (SRAM)). It is to be appreciated and understood that, while one memory component 102 is depicted in system 100, the subject innovation is not so limited, as system 100 can include a plurality of memory components 102. Only one memory component 102 is depicted herein for brevity and clarity.

Memory component 102 can also include an optimized controller component 106 that can be associated with the memory array 104, and can facilitate access of the memory array 104 and data stored therein. The optimized controller component 106 can facilitate control of the flow of data to and from the memory component 102. In an aspect, the optimized controller component 106 can facilitate execution of operations (e.g., read, write, verify, erase) associated with memory locations in the memory array 104. In another aspect, the optimized controller component 106 can facilitate verifying and/or maintaining the desired charge level(s) associated with data stored in the memory locations in the memory array 104. In accordance with another aspect, the optimized controller component 106 can facilitate performing tasks and/or functions offloaded to the memory component 102 by a host 108.

In accordance with an aspect, the memory component 102 can be communicatively connected to the host 108. The connection can be a wired connection (e.g., via a bus) or a wireless connection (e.g., Wi-Fi, Bluetooth, etc.). The memory component 102 can be removable media (e.g., flash stick) and/or can maintain a relatively constant connection to the host 108. In accordance with one embodiment of the disclosed subject matter, the memory component 102 can serve as a slave to the host 108 whereby, along with being used to manage and control the transfer and storage of data between the host 108 and the memory component 102, the memory component 102 can also be utilized to perform certain other tasks, functions, and/or operations that conventionally would be performed by the host 108.

In one aspect, the memory component 102 and the host 108 can identify and/or authenticate with respect to each other in accordance with a protocol. For example, the host 108 can provide authentication information, such as a unique identification (e.g., unique unit number, key, device address) or a password, to the memory component 102, and the memory component 102 can provide authentication information, such as a unique identification (e.g., unique unit number, key, device address) or password, to the host 108 to facilitate authentication with respect to each other. Based in part on valid authentication information from the memory component 102 and the host 108, the memory component 102 can authenticate the host 108, and the host 108 can authenticate the memory component 102. In another aspect, the respective pieces of authentication information can also be utilized to facilitate cryptographic processes with regard to data associated with the memory component 102.

In accordance with another aspect, there can be varying levels of authentication (e.g., high, medium, and/or low levels of authentication) where the level of authentication can be based in part on the authentication information provided by the host 108 and/or memory component 102. The level of authentication can facilitate determining the rights granted to the memory component 102 with respect to the host 108 and to the host 108 with respect to the memory component 102, where the rights can relate to a level of access (e.g., to the memory component 102) and/or the tasks, functions, and/or operations that can be offloaded by the host 108 to the memory component 102, for instance.

In accordance with another aspect, when the host 108 and memory component 102 have mutually authenticated, the host 108 can query (e.g., interrogate) the memory component 102 as to the tasks, functions, and/or operations that the memory component 102 can perform. The memory component 102 can provide the host 108 with information relating to the tasks, functions, and/or operations (e.g., cryptographic functions, authentication functions, searching for sensitive information, searching for e-mail, an aggregation function, an evaluation function, a mathematical function, a print function, a function related to a set-top box, a function related to electronic gaming, a function related processing of digital video or audio, a function to facilitate managing digital rights, etc.) that the memory component 102 can perform. For instance, in one embodiment, the functionality of the memory component 102 can be such that the memory component 102 can perform virtually any task, function, and/or operation that can be performed by the host 108. Based in part on the level of authentication, the available functionality of the memory component 102, and/or the level of sensitivity of the data stored in the memory component 102, the host 108 can determine the task(s), function(s), and/or operation(s) that can be performed by the memory component 102. The host 108 can also determine which task(s), function(s), and/or operation(s) it desires to offload to the memory component 102, where the memory component 102 can act as a slave with respect to the host 108.

In one aspect, the host 108 can select one or more of the available tasks, functions, and/or operations that the host 108 desires the memory component 102 to perform, and can transmit information (e.g., instructions, request, etc.) to facilitate initializing and/or activating the memory component 102 so that the memory component 102 can perform the desired task, function, and/or operation being offloaded to the memory component 102 by the host 108, and/or requesting the memory component 102 to perform such task, function, and/or operation. In accordance with one embodiment, the memory component 102 will not include its own operating system. In accordance with another embodiment, the memory component can contain its own operating system and/or software applications that the optimized controller component 106 can facilitate managing and utilizing.

In one aspect, the memory component 102, as a slave to the host 108, can query the host 108 for information (e.g., instructions, code, data, etc.) that can be utilized to perform the specified task, function, or operation. In another aspect, the memory component 102 can already have some or all of the information that is to be utilized to perform the task, function, or operation. Utilizing the information associated with the task, function, or operation, the memory component 102, employing the controller component 106, can perform the desired task, function, or operation. The memory component 102 can transmit a result(s) from the memory component 102 to the host 108, where the data or other information in the memory component 102 utilized to produce the result(s) can remain in the memory component 102 and is not available to the host 108. Further, the result(s) can be transmitted to volatile memory in the host 108 such that, for example, the result(s) can be used temporarily by the host 108 (e.g., displayed in a user interface) and is not saved to a hard drive or other permanent storage associated with the host 108. After the offloaded task, function, or operation is performed, the memory component 102 and host 108 each can "clean" their respective environments to securely dispose of information that is no longer needed.

The host 108 can utilize the memory component 102 to perform other tasks, functions, and/or operations, as desired. If there are no further slave functions or other functions to be performed by the slave (e.g., memory component 102), the memory component 102 can be disconnected from the host 108, as desired, for instance, if the memory component 102 is removable media.

For example, a host 108 can be connected to the memory component 102. The memory component 102 can have stored therein e-mails and associated information and the user deems at least some of the e-mail content and/or associated information to be sensitive in nature, where the information can be confidential and/or proprietary business information that the user desires to be securely stored in the memory component 102 and not generally available to the host 108, the permanent storage (e.g., hard drive) of the host 108, and/or other entities. For instance, the e-mails can relate to clients of the user and can include confidential information regarding dealings with respective clients or be associated with other confidential information (e.g., tag information indicating the respective levels of importance of clients). The user desires to search for certain e-mails stored in the memory array 104 of the memory component 102, but desires to do so in a secure manner so sensitive information associated therewith is not provided to the host 108 or other entities.

To facilitate maintaining the security of such information, the host 108 and the memory component 102 can authenticate against each other by each providing authentication information to the other. Based in part on the authentication information, the memory component 102 and host 108 authenticate with respect to each other. The host 108 interrogates the memory component 102 to determine the tasks, functions, and/or operations that the memory component 102 can perform. The memory component 102 can transmit functionality information to the host 108, wherein one of the functions that the memory component 102 can perform relates to searching for e-mails and retrieving information associated therewith. The host 108 can send an instruction to the memory component 102 to activate the functionality relating to e-mails in the memory component 102.

The memory component 102 can request from the host 108 information that can facilitate performing the e-mail-related function, where the information can relate to the e-mail(s) or associated information (e.g., date(s) of e-mail(s), names) of client(s), etc.) desired by the host 108, the tasks (e.g., retrieve particular information from the e-mail(s)) or processes (e.g., perform mathematical operations on respective financial figures from disparate e-mails to produce a result) that the host 108 desires the memory component 102 to perform with respect to the e-mail(s) or associated information, and/or other information. The host 108 can transmit the requested information to the memory component 108. The memory component 102 can also have stored therein information that can facilitate performing the offloaded e-mail-related function.

The optimized controller component 106 can facilitate executing the e-mail-related function to search the memory array 104 for the desired e-mail information, retrieve the desired e-mail information, and can process the retrieved information to produce a result, as specified by the host 108 when it activated such functionality and requested the memory component 102 to perform such function. The optimized controller component 106 can facilitate transmitting the result to the host 108, and the host 108 can receive the result, which can be stored in temporary storage (e.g., volatile memory) associated with the host 108, where the result can be utilized (e.g., displayed in a user interface), as desired, by the host 108. Only the result is provided to the host 108; the e-mail information that was accessed, retrieved, and processed by the memory component 102 and other associated information (e.g., tag information related to the importance of respective clients) is not provided to the host 108 and cannot be accessed by the host 108. The memory component 102 can "clean" its environment by securely disposing of unwanted information related to performing the function, and the host 108 can securely dispose of the result to "clean" its environment, as the result is in temporary storage and can be disposed of when the temporary storage is cleared, such as when the host 108 is turned off or the temporary storage is otherwise cleared. The memory component 102 can be disconnected from the host 108 after the offloaded function is completed, as desired.

Thus, the subject innovation can facilitate the performance of tasks, functions, and/or operations on data (e.g., sensitive information) in a secure environment. Information associated with the memory component 102, such as sensitive information, can be secured in the memory component 102, and the memory component can perform certain tasks, functions, and/or operations on such information in a secure environment, and can provide a result(s) to the host 108 related to such information without providing the information in the memory component 102 itself and/or other data related to such information. Also, the host 108 can remain free to perform other functions or tasks, while the memory component 102 performs the offloaded tasks, functions, and/or operations.

Referring again to the memory component 102, the non-volatile memory can include, but is not limited to, flash memory (e.g., single-bit flash memory, multi-bit flash memory), read-only memory (ROM), mask-programmed ROM, programmable ROM (PROM), Erasable PROM (EPROM), Ultra Violet (UV)-erase EPROM, one-time programmable ROM, electrically erasable PROM (EEPROM), and/or nonvolatile RAM (e.g., ferroelectric RAM (Fe-RAM)). A flash memory can be comprised of NAND memory and/or NOR memory, for example. Volatile memory can include, but is not limited to, random access memory (RAM), SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Figure 2:
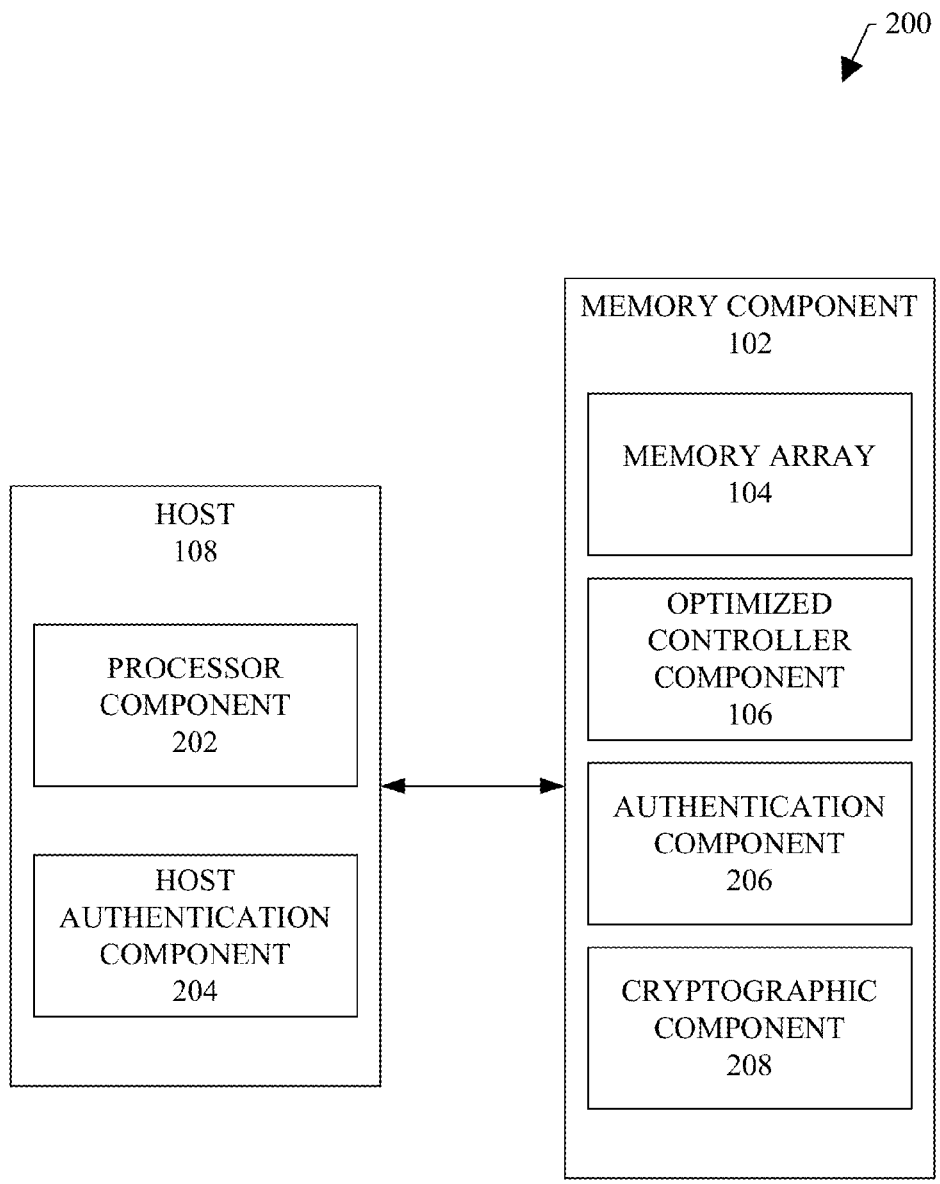
FIG. 2 depicts a block diagram of another system that can facilitate employing a memory component as a slave associated with a host in accordance with the disclosed subject matter.

Referring to FIG. 2, depicted is a block diagram of a system 200 that can facilitate employing a memory component as a slave associated with a host in accordance with an aspect of the disclosed subject matter. System 200 can comprise of a memory component 102 that can be utilized to store data, and can also be employed as a slave to a host 108. The memory component 102 can include a memory array 104 that can contain a plurality of memory cells, where each memory cell can store one or more bits of data. The memory component 102 can further contain an optimized controller component 106 that can facilitate performing tasks, functions, and/or operations related to the data associated with the memory component 102. The memory component 102 can be associated with a host 108 that can desire storing, retrieving, and/or utilizing data associated with the memory component 102. The memory component 102, memory array 104, optimized controller component 106, and host 108 each can be the same or similar as, and/or can comprise the same or similar respective functionality as, respective components, such as more fully described herein, for example, with regard to system 100.

The host 108 can include a processor component 202 (e.g., host processor) that can be can be an applications processor that can manage communications and run applications. In one aspect, the processor component 202 can be a processor that can be utilized by a computer, a mobile handset, personal digital assistant (PDA), or virtually any other electronic device. The processor component 202 can generate commands, such as read commands, write commands, and/or erase commands that can be executed respectively to read data from, write data to, and/or erase data from the memory component 102. Data being written to or read from memory component 102 can be communicated or transmitted between the memory component 102 and the processor component 202 and/or other components (not shown) via a bus (e.g., system bus), which can be a multi-bit bus, for example, and/or via a wireless connection (e.g., Bluetooth, Wi-Fi, etc.).

In one aspect, the bus can be comprised of any of several types of bus structure(s) including, but not limited to, a peripheral bus or external bus, and/or a local bus using any variety of available bus architectures including, but not limited to, Open NAND Flash Interface, Compact Flash Interface, Multimedia Card (MMC), Secure Digital (SD), CE-ATA, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

To facilitate secure communication of information between the host 108 and the memory component 102, the host 108 can also contain a host authentication component 204 that can facilitate authenticating a memory component 102 and/or can facilitate providing authentication information to the memory component 102 to authenticate the host 108 with respect to the memory component 102. In one aspect, the host authentication component 204 can solicit authentication data from an entity or component, such as a memory component 102, and can evaluate the authentication information received from the entity or component to facilitate controlling access to the host 108 based in part on the authentication data. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), a unique device identification (e.g., device number), a physical signature (e.g., PUF), and the like, for example. Additionally and/or alternatively, public key infrastructure (PKI) data can also be employed by the host authentication component 204. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to facilitate encrypting and decrypting messages communicated between entities/components.

In another aspect, the memory component 102 can include an authentication component 206 that can facilitate authenticating other components, such as host 108, and/or entities to facilitate controlling access to the memory component 102. The authentication component 206 can also facilitate providing authentication data to facilitate authenticating the memory component 102 with respect to another component (e.g., host 108) and/or entity.

In one aspect, the authentication component 206 can solicit authentication data from an entity or component, such as host 108, and can evaluate the authentication received from the entity or component, based in part on the authentication data provided, the authentication component 206 can facilitate controlling access to the memory component 102 and data associated therewith. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), a unique device identification (e.g., device number), a physical signature (e.g., PUF), and the like, for example. Additionally and/or alternatively, public key infrastructure (PKI) data can also be employed by authentication component 206. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

In accordance with one embodiment, the authentication component 206 can implement one or more machine-implemented techniques to identify an entity by its unique physical and behavioral characteristics and attributes. Biometric modalities that can be employed can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, and finger print identification that scans the corrugated ridges of skin that are non-continuous and form a pattern that can provide distinguishing features to identify an entity.

In accordance with one aspect, there can be various levels of authentication and/or associated access rights granted to the host 108 and/or memory component 102 based in part on the respective authentication data (e.g., authentication credentials) respectively provided by the host 108 and memory component 102, the level of security associated with respective subsets of data associated with the memory component 102, and/or other access criteria. For example, there can be one level of access rights granted to a host 108 with respect to data associated with the memory component 102, when the host 108 authenticates with the memory component 102 using a unique identification number associated with the host 108, but a disparate level of access rights (e.g., higher level of access rights) can be granted to the host 108 when key information is provided to facilitate authentication of the host 108 to the memory component 102. The number of varied levels of access or authentication can be as desired.

In accordance with another aspect of the disclosed subject matter, the memory component 102 can also comprise a cryptographic component 208 that can provide asymmetric cryptographic accelerators and tools (e.g., RSA, Digital Signature Standard (DSS), and the like) to facilitate encryption and/or decryption of data to facilitate securing data associated with the memory component 102. Additionally, cryptographic component 304 can provide accelerators and tools (e.g., Secure Hash Algorithm (SHA) and its variants such as, for example, SHA-0, SHA-1, SHA-224, SHA-256, SHA-384, and SHA-512) to facilitate encryption and/or decryption of data to facilitate securing data associated with the memory component 102.

As a non-limiting example in accordance with one embodiment of the disclosed subject matter, a host 108 can be a set-top box (e.g., or other video-related device) can be utilized to facilitate displaying video files (e.g., movies), where the video files can be encrypted to facilitate securing the video files from viewing (e.g., for privacy reasons; until a fee is paid, etc.). The set-top box can include a hard drive where digital information can be stored, such as when digital information (e.g., movies, television shows) is transmitted to the set-top box. In addition, the set-top box can have an interface to which a memory component 102 can be communicatively connected. The memory component 102 can have stored in its memory array 104 data, including video files, that the user desires to remain secure in the memory component 102, that is, the user can desire that the video file stored in the memory component 102 not be transferred to and stored in to the host 108 (e.g., set-top box). The memory component 102 can also contain a cryptographic component that can employ a cryptographic protocol to facilitate decrypting the data stored in the memory component 102.

The user can desire to access one of the video files stored in the memory array 104 of the memory component 102, but does not want the video file transferred and stored in the hard drive, as the user simply desires that such video file be viewable in a display associated with the user interface of the set-top box (e.g., television screen associated with the set-top box).

The host 108 can interface with the memory component 102 to communicatively connect with the host 108. The host can query the memory component 102 to learn and/or determine the available functionality of the memory component 102, where the memory component 102 can provide information regarding its functionality to the host 108, where such information can include functionality related to performing cryptographic processes on data (e.g., decrypting data stored in the memory array 104). The host 108 can activate the cryptographic functionality of the memory component 102 such that the optimized controller component 106 in conjunction with the cryptographic component 208 in the memory component 102 can facilitate decrypting the desired video file stored in the memory array 104. The memory component 102 can request and/or can receive instructions from the host 108 that can facilitate decrypting the video file, such as the video file to be read from the memory array 104, the cryptographic protocol to be employed to decrypt the video file, etc.

The optimized controller component 106 can facilitate searching the memory array 104 for the desired video file associated with the request (e.g., command) to locate the desired video file. The optimized controller component 106 can also facilitate retrieving the desired cryptographic protocol to facilitate decrypting the video file. The optimized controller component 106 in conjunction with the cryptographic component 208 can process the encrypted video file to decrypt the video file and can transmit the decrypted video file to the host 108 (e.g., set-top box) where the host 108 can display the video file in the user interface (e.g., television screen), where, for instance, the decrypted video file can be streamed from the memory component 102 to the host 108 to be displayed in the user interface associated with the host 108. The decrypted video file is not stored in the hard drive of the host 108. After the video file has been viewed, the memory component 102 can be disconnected from the host 108, and the host 108 will not have the video file stored thereon.

Thus, the video can be viewed, as desired by the user, but is not stored on the host 108, also as desired by the user. The video file can remain securely stored in the memory component 102.

In accordance with one embodiment of the disclosed subject matter, the memory component 102, including the memory array 104, optimized controller component 106, authentication component 206, cryptographic component 208, and/or other components (not shown), can be situated or implemented on a single integrated-circuit chip. In accordance with another embodiment, the memory component 102, including the memory array 104, optimized controller component 106, authentication component 206, cryptographic component 208, and/or other components (not shown), can be implemented on an application-specific integrated-circuit (ASIC) chip. In yet another embodiment, the memory component 102 including the memory array 104, optimized controller component 106, authentication component 206, cryptographic component 208, and/or other components (not shown), can be situated or implemented on multiple dies or chips.

Figure 3:
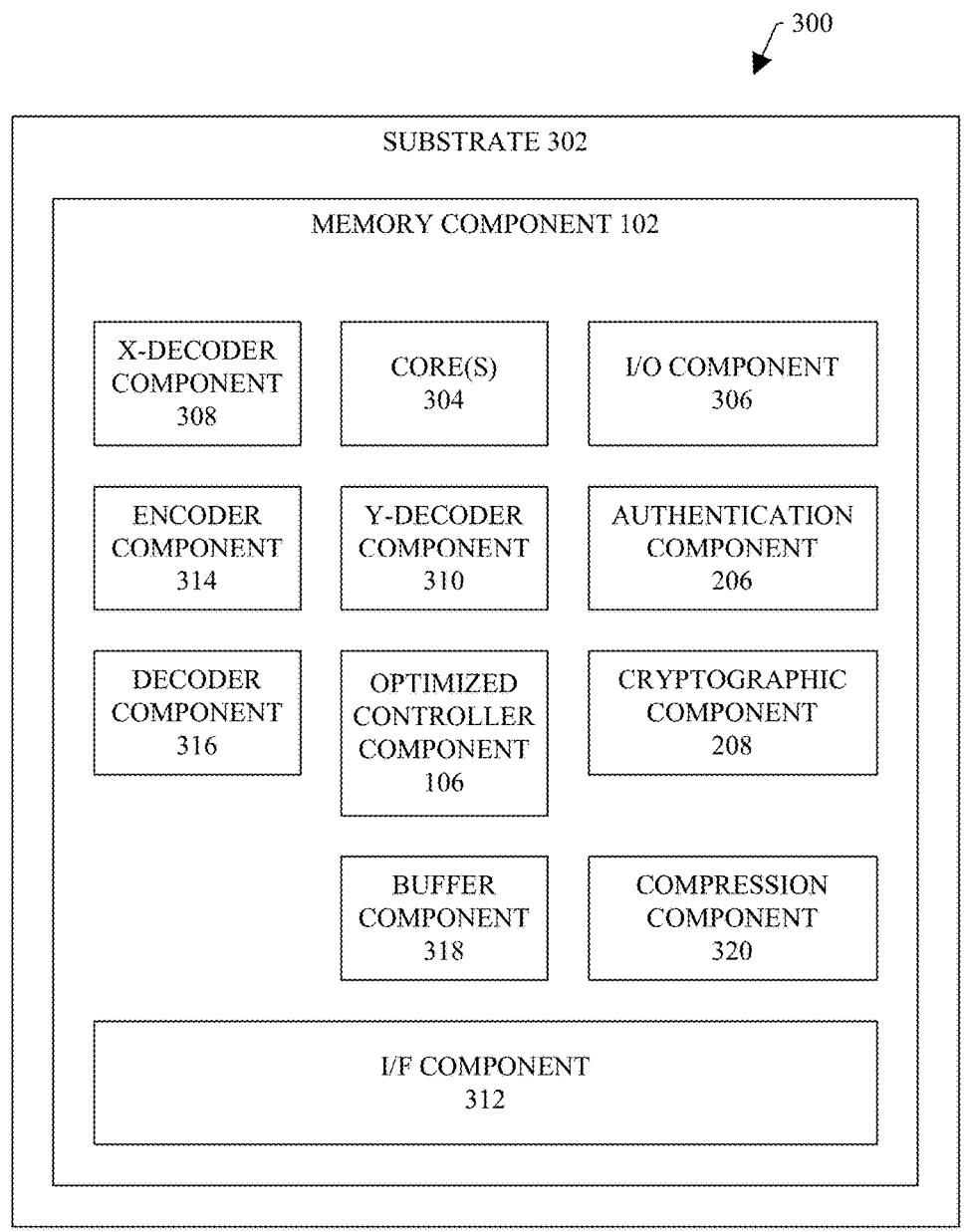
FIG. 3 is a block diagram depicting a system that can facilitate storage of data and performance of slave functions associated with a memory in accordance with an aspect of the disclosed subject matter.

Turning to FIG. 3, depicted is a diagram of a memory device 300 that can facilitate storage of data and performance of slave functions in accordance with an aspect of the disclosed subject matter. Memory device 300 can include a memory component 102 that can comprise a non-volatile memory (e.g., flash memory) and/or volatile memory (e.g., random access memory (RAM)). The memory component 102 can receive information, including data, commands, and/or other information, which the memory component 102 can process (e.g., store data, execute commands, etc.). The memory component 102 can include a memory array(s) 104 (e.g., as illustrated in FIG. 1 and described herein) that can comprise a plurality of memory cells in which data can be stored. The memory component 102 can also comprise an optimized controller component 106 that can facilitate performing functions, tasks, and/or operations, associated with the memory component 102, and can facilitate enabling the memory device 300 to function as a slave to a processor component (e.g., processor component 108, as illustrated in FIG. 1 and described herein) to perform certain functions, tasks, and/or operations offloaded to the memory device 300 by the processor component. The memory component 102, memory array 104, and optimized controller component 106 each can be the same or similar as, and/or each can contain the same or similar functionality as, respective components more fully described herein, for example, with regard to system 100 and/or system 200.

In one aspect, the memory component 102, including the memory array 104 and optimized controller component, and other components described herein, for example, with regard to memory device 300 can be formed and/or contained on a substrate 302 (e.g., semiconductor substrate). In another aspect, one or more core components 304 (e.g., high-density core regions) and one or more lower-density peripheral regions can be formed on the substrate 302. The core component(s) 304 typically can include one or more M by N arrays (e.g., memory array 104) of individually addressable, substantially identical multi-bit memory cells (not shown).

The lower-density peripheral regions can typically include an input/output component 306 (e.g., input/output (I/O) circuitry) and programming circuitry for selectively addressing the individual memory cells. The programming circuitry can be represented in part by and can include one or more x-decoder components 308 and one or more y-decoder components 310 that can cooperate with the I/O component 306 for selectively connecting a source (not shown), gate (not shown), and/or drain (not shown) of selected addressed memory cells to predetermined voltages or impedances to effect designated operations (e.g., programming, reading, verifying, erasing) on the respective memory cells, and deriving necessary voltages to effect such operations. For example, an x-decoder component 308 and a y-decoder component 310 can each receive address bus information, which can be provided as part of a command, and such information can be utilized to facilitate determining the desired memory cell(s) in the memory component 102.

Figure 4:
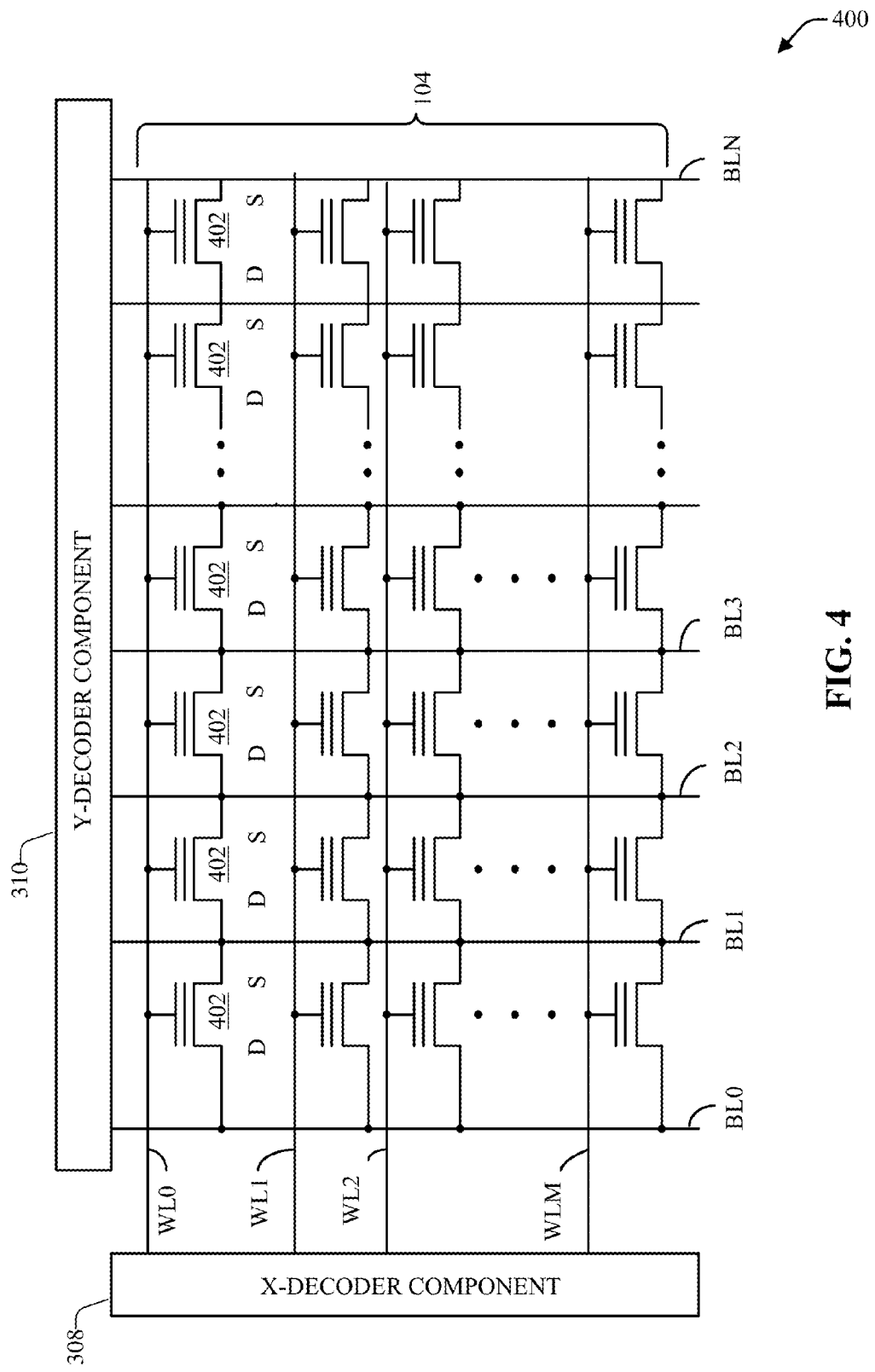
FIG. 4 illustrates a block diagram of a system that facilitates data storage associated with a memory in accordance with the disclosed subject matter.

The memory component 102 can receive information (e.g., data, commands, etc.) via an interface component 312 (also referred to herein as "I/F 312"), which can also be formed on substrate 302. I/F 312 can include and/or provide various adapters, connectors, channels, communication paths, etc. to integrate the memory component 102 into virtually any operating and/or database system(s) and/or with one another system(s). In addition, I/F. 312 can provide various adapters, connectors, channels, communication paths, etc., that can provide for interaction and/or communication with a processor component (e.g., as depicted in FIG. 4 and described herein), and/or any other component, data, and the like, associated with the memory device 300.

The memory component 102 can also contain an encoder component 314 that can facilitate encoding data being programmed to the memory component 102, where the encoder component 314 also can be formed on the substrate 302. For example, the encoder component 314 can facilitate converting a digital signal to an analog signal (e.g., current level) to facilitate programming data in the memory locations (e.g., memory cells) in the memory component 102.

The memory component 102 can further include a decoder component 316 that can facilitate decoding data being read from the memory component 102. The decoder component 316 can receive an analog signal associated with data, where the analog signal can be stored in the memory location in the memory array 104, and can facilitate converting the analog signal to a digital signal, so that such digital signal representing the read data can be provided to another component (e.g., processor component) for further processing.

In one aspect, the memory component 102 can also include a buffer component 318 that can be formed on the substrate 302. The buffer component 318 can facilitate storage of data, for example, to temporarily store data, being written to and/or read from the memory array 104. The buffer component 318 can comprise volatile memory (e.g., SRAM, DRAM) and/or nonvolatile memory (e.g., flash memory).

Memory component 102 can further include a compression component 320 that can be formed on substrate 302 and can be used to facilitate the compression and decompression of data and/or code to be stored in the memory array 104, to facilitate reducing and/or minimizing the consumption of the available memory in the memory array 104. For example, in response to a request by a host processor (e.g., processor component 108) to read data (e.g., MP3 file) from the memory component 102, the optimized controller component 106 can facilitate the retrieval of the requested data from the memory array 104, with the compression component 320 being used to facilitate the de-compression of the data being read from the memory 104. The decompressed data can be provided by the optimized controller component 106 to the host processor. In another aspect, the compression component 320 can be used to compress data being received from a host processor for storage in the memory array 104, with the compression component 320 compressing the data as part of the data storage process. Common forms of data compression include algorithms based upon the Lempel-Ziv (LZ) compression method including LZ-Welch, LZ-Renau, and Huffman. Data compression techniques can be "lossy" or "lossless", where "lossy" compression can involve the loss of information between the source code and the compressed code and can be an acceptable effect in such applications as image and sound files, and "lossless" compression schemes can be reversible, allowing the original data to be fully reconstructed. Choice between the use of "lossy" vs. "lossless" compression can depend in part upon the application and file type to be compressed.

In one aspect, memory device 300 can also include a bus (not shown) that can be comprised of any of several types of bus structure(s) including, but not limited to, a peripheral bus or external bus, and/or a local bus using any variety of available bus architectures including, but not limited to, Open NAND Flash Interface, Compact Flash Interface, Multimedia Card (MMC), Secure Digital (SD), CE-ATA, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1394), and Small Computer Systems Interface (SCSI).

Turning to FIG. 4, depicted is a diagram of a system 400 that can facilitate data storage associated with a memory (e.g., memory component 102) in accordance with an embodiment the disclosed subject matter. The system 400 can include a memory array(s) 104 that can include a plurality of memory cells 402 that each can be comprised of a drain, gate, and/or source. In accordance with an aspect, each memory cell 402 can be a multi-level cell, where data can be represented by the level of charge stored within the cell 402. In accordance with another aspect, one or more bits of data can be stored in each memory cell 402. The system 400 can be included in a memory component (e.g., 102), such as described in system 100, system 200, and/or system 300, for example. In accordance with one embodiment, the system 400 can be part of a flash memory device. For example, a NOR flash memory and/or a NAND flash memory.

The system 400 can include an X-decoder component(s) 308 (e.g., word line (WL) decoder) and a Y-decoder component(s) 310 (e.g., bit line (BL) decoder) that can each respectively decode inputs/outputs during various operations (e.g., programming, reading, verifying, erasing) that can be performed on the memory cells 402. The X-decoder component 308 and Y-decoder component 310 can each receive address bus information from a processor component (e.g., 202) and/or optimized controller component (e.g., 106) or the like, and can utilize such information to facilitate accessing or selecting the desired memory cell(s) 402 (e.g., memory location(s)) associated with the command. In one aspect, the memory cells 402 can be formed in M rows and N columns. A common WL can be attached to the gate of each memory cell 402 in a row, such as word-lines WL0, WL1, WL2, through WLM. A common BL can be attached to each cell 402 in a column, such as bit-lines BL0, BL1, through BLN. A WL can contain, for example, a plurality of elements (e.g., 512, 1024, 2048, etc.) forming multiple words. A sector can include a plurality of WLs, such as, for example, 512 WLs that can provide 512 k or more elements of memory, where the memory array 104 can comprise a plurality of sectors that can each contain a subset of memory cells 402. In accordance with an aspect of the disclosed subject matter, respective voltages can be applied to one or more memory cells 402 through the WLs and BLs to facilitate performing operations, such as program, read, erase, and the like.

It is to be appreciated that while the memory cells 402 are shown as being respectively associated with a drain and a source, in accordance with one embodiment, where a memory cell 402 contains charge storage elements on two sides of a transistor associated with a cell 402 that can each be programmed, the drain can act as the source, and/or the source can act as the drain, depending on which portion of the memory cell 402 is being charged during a given operation.

Figure 5:
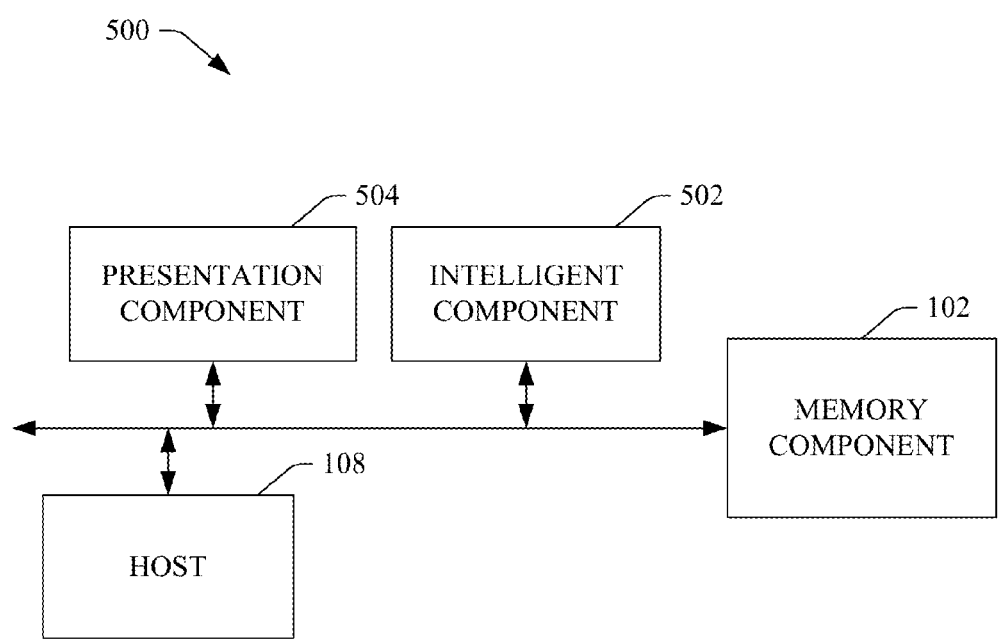
FIG. 5 a block diagram of a system that can employ intelligence to facilitate secure access of data associated with a memory in accordance with the disclosed subject matter is illustrated.

Referring to FIG. 5, depicted is a block diagram of a system 500 that can employ intelligence to facilitate secure access of data associated with a memory in accordance with an aspect of the disclosed subject matter. System 500 can include a memory component 102 that can be comprised of a non-volatile memory (e.g., single-bit flash memory, multi-bit flash memory) and/or volatile memory (e.g., SRAM). The memory component 102 can include a memory array 104 that can be comprised of a plurality of memory cells (not shown), which can be memory locations, wherein, for each memory cell, one or more bits of data can be stored, and from which stored data can be read. It is to be appreciated that the memory component 102, memory array 104, and host 108, each can be the same or similar as respective components, and/or can contain the same or similar functionality as respective components, as more fully described herein, for example, with regard to system 100, system 200, memory device 300, and/or system 400.

The system 500 can further include an intelligent component 502 that can be associated with the memory component 102 and/or other components to facilitate analyzing data, such as current and/or historical information, and, based in part on such information, can make an inference(s) and/or a determination(s) regarding, for example, whether authentication can be validated with respect to a host (e.g., 108), a level of authentication and/or access rights that can be granted, a level of sensitivity and/or security of data associated with the memory component 102, etc.

For instance, based in part on current and/or historical evidence, the intelligent component 502 can infer that data stored in the memory component 102 is of a sensitive (e.g., confidential) nature and that a higher level of security can be desired and/or provided with regard to such data. Based in part on the inference with respect to such data by the intelligent component 502, the memory component 102 can provide a higher level of security with respect to such data, where, for example, a memory component 102 can desire particular authentication credentials (e.g., key information) in order to grant another component (e.g., host 108) or entity access rights to such data and/or to provide results associated with such data.

It is to be understood that the intelligent component 502 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

System 500 also can include a presentation component 504, which can be associated with and/or incorporated in the host 108. The presentation component 504 that provides various types of user interfaces to facilitate interaction between a user and any component coupled to the host 108. As depicted, the presentation component 504 is a separate entity that can be utilized with the host 108 and associated components. However, it is to be appreciated that the presentation component 504 and/or similar view components can be incorporated into the host 108 and/or a stand-alone unit. The presentation component 504 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the host 108.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 6:
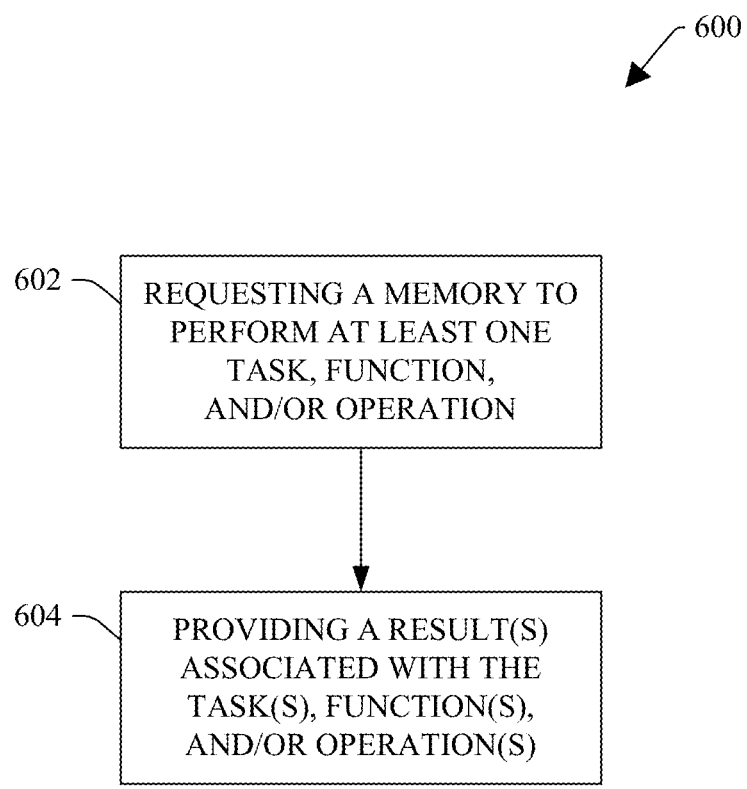
FIG. 6 illustrates a methodology that can facilitate employing a memory as a slave for a host in accordance with an aspect of the disclosed subject matter.
Figure 7:
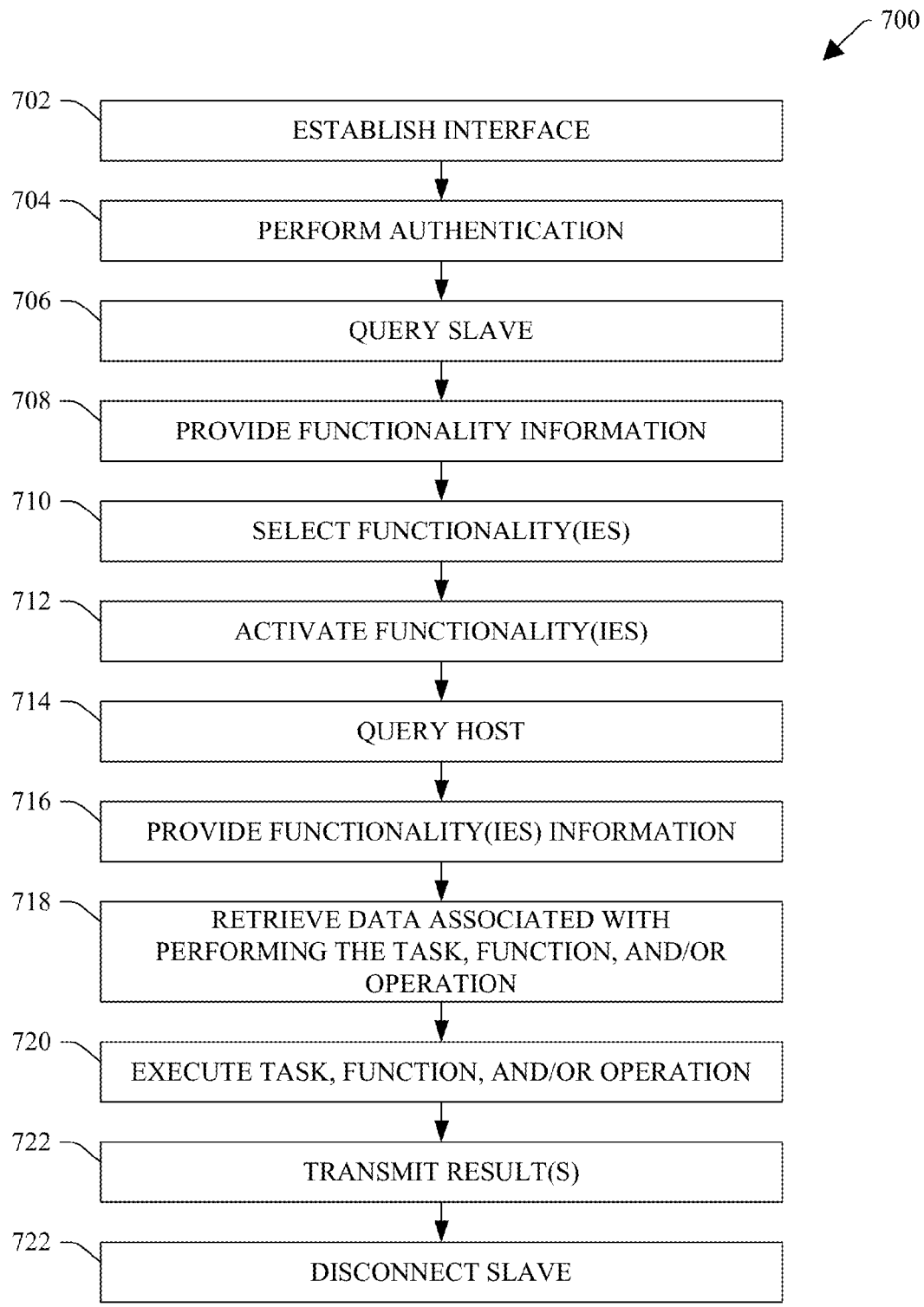
FIG. 7 depicts a methodology that can facilitate using a memory component as a slave to a host in accordance with an aspect of the disclosed subject matter.
Figure 8:
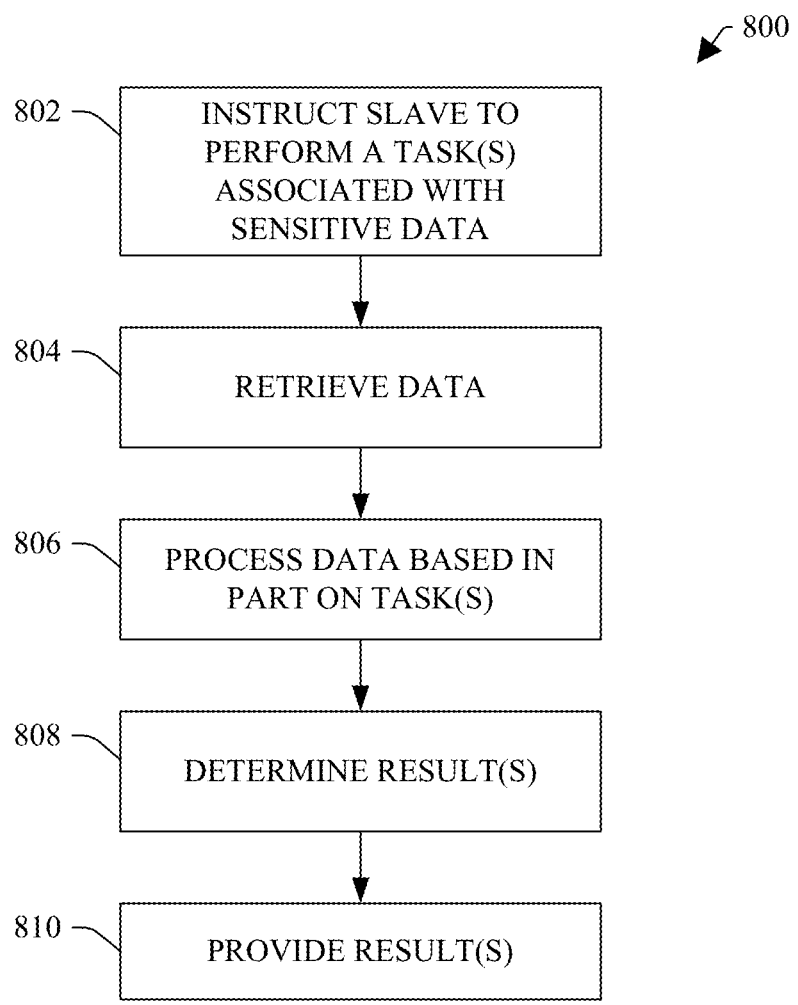
FIG. 8 illustrates a methodology that can facilitate performing tasks on secured data associated with a memory in accordance with the subject matter disclosed herein.

FIGS. 6-8 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring to FIG. 6, a methodology 600 that can facilitate employing a memory as a slave for a host in accordance with an aspect of the disclosed subject matter is illustrated. At 602, requesting a memory component (e.g., 102) to perform a task, function, and/or operation based in part on information received from the memory component. In one aspect, the memory component and a host (e.g., 108) can authenticate against each other by the memory component providing authentication information to the host, and the host providing authentication information to the memory component. Based in part on the respective authentication information provided, the host can grant certain rights to the memory component with regard to the types of tasks the host can entrust to be performed by the memory component in a slave mode, and the memory component can grant a set of access rights to the host that enables the host to access certain data in the memory component. There can be multiple levels of respective rights based in part on the authentication information provided to the respective components (e.g., host, memory component).

In another aspect, the host can query the memory component regarding the functionality the memory component has to determine the tasks that the memory component can perform, and the memory component can provide to the host information regarding its functionality and/or the tasks it can perform. Based in part on the information regarding the tasks the memory component can perform, the host can select one or more tasks that the host desires to offload to the memory component for the memory component to perform. The host can generate a request(s) and provide the request(s) to the memory component requesting that the memory component perform the specified task. In accordance with an aspect, the host can facilitate activating the functionality related to the task in the memory component.

At 604, providing a result(s) associated with the task, function, and/or operation. In one aspect, the memory component can perform the task(s) offloaded to the memory component by the host. The memory component can transmit the result(s) associated with the task(s) to the host, where the host receives such result(s), but the host does not access the data in the memory component, or other data associated with such data, that the memory component utilized to generate the result(s). For example, the data can be sensitive data, such as confidential or private e-mails, financial information, proprietary information, business information, trade secrets, etc., that a user desires to be secured in the memory component and not available to the host. By employing the memory component as a slave, such data and other data associated therewith can be secure in the memory component, and the memory component, rather than the host, can access the information to perform a task on such data, and only provide the host with the result(s) from the performed task. At this point, methodology 600 can end.

Turning to FIG. 7, illustrated is a methodology 700 that can facilitate using a memory component (e.g., memory device) as a slave to a host in accordance with an aspect of the disclosed subject matter. At 702, an interface can be established. In one aspect, a host can interface with a memory component (e.g., 102), which can be employed as a slave to the host. The host can be connected to the memory component via a hardwired connection (e.g., USB, Firewire, etc.) or via a wireless connection (e.g., Bluetooth, Wi-Fi, etc.).

At 704, an authentication can be performed. In accordance with an aspect, the host and memory component can mutually authenticate with each other in order to identify the host to the memory component and vice versa, and to facilitate determining the respective rights that the host can grant to the memory component and the memory component can grant to the host. The host and the memory device can exchange authentication information, where such authentication information can comprise unique device identification information, physically uncloneable function (PUF) information, unique device address(es), key information, and/or other information, for example.

At 706, the slave (e.g., memory component) can be queried. In one aspect, the host can query the memory component regarding the functionality of the memory component to facilitate determining the tasks that the memory component can perform, for example, as a slave to the host. At 708, functionality information can be provided. In another aspect, the memory component can retrieve and provide functionality information to the host, which can be a list of available tasks, functions, and/or operations that it can perform, for example. In accordance with another aspect, the available functionality of the memory component can be displayed by the host in a user interface to facilitate enabling a user to select one or more functionalities via the user interface.

At 710, one or more functionalities can be selected. In one aspect, the host can automatically select one or more functionalities of the memory component. In accordance with another aspect, the host can receive information from a user via a user interface as to one or more functionalities a user desires the memory component to exercise or perform.

At 712, one or more functionalities can be activated. In accordance with an aspect, the host can facilitate activating one or more functionalities of the memory component based in part on the selection of the one or more functionalities. The host can send an instruction or other information to facilitate activating such functionality(ies).

At 714, the host can be queried. In one aspect, the memory component can query the host to facilitate obtaining information the memory component desires in order to perform the offloaded task(s). At 716, the information related to performing the task(s) can be provided. For instance, the host can respond to the query by providing information, including instructions, to the memory component to facilitate performing the task. In another aspect, the memory component can have some or all of the information it desires to perform the task(s) within the memory component, and does not need information from the host in order to perform the task(s).

At 718, data associated with the task(s) can be retrieved. In one aspect, the memory component can access and/or retrieve data related to the task(s) from the memory array (e.g., 104) to facilitate performing the task(s). At 720, the task(s) can be executed. For example, the memory component can perform the desired task(s), such as by processing the retrieved data based in part on the task(s) being performed, to facilitate generating a result(s).

At 722, the result(s) can be transmitted. The result(s) generated based in part on the task(s) performed on the data can be transmitted (e.g., published) from the memory component to the host. The host can receive the result(s) and can store the result in temporary storage (e.g., volatile memory), where the host can utilize the result(s), as desired. For example, the host can present (e.g., display, present to be perceived or sensed) the result(s) in a user interface (e.g., presentation component 504, as illustrated in FIG. 5 and described herein). The subject innovation can facilitate securing the data stored in the memory component, as the memory component does not provide the host so that the host can perform tasks (e.g., process) on the data retrieved from the memory component. Instead, the subject innovation enables the memory component to be used as a slave, where the host offloads the task(s) to the memory component and the memory component performs the tasks without providing the data, which can be sensitive information, to the host, but rather, only providing the result(s) of the task(s) to the host. As a result, the data in the memory component can remain secured in the memory component.

In accordance with another aspect, the host and the memory component can each "clean" their respective environments, as desired, that is, the host can facilitate disposing of the result(s) after it has been utilized by the host, and the memory component can facilitate securing of the data utilized in performing the task(s) so that such data cannot be accessed by other components (e.g., host).

At 724, the interface can be disconnected. In one aspect, the memory component can be disconnected from the host, as desired, such as when there are no other tasks, functions, or operations to be performed by the memory component. At this point, methodology 700 can end.

Turning to FIG. 8, illustrated is a methodology 800 that can facilitate performing tasks on secured data associated with a memory in accordance with an aspect of the disclosed subject matter. For instance, the secured data can be data stored in a memory component (e.g., 102) and can include a subset of data that is deemed sensitive information (e.g., personal, confidential, financial, proprietary, trade secrets, etc.). At 802, a slave (e.g., memory component) can be instructed to perform one or more tasks (e.g., processes) associated with sensitive data. The tasks that the memory component can be instructed to perform can involve sensitive data and or other data associated with the sensitive data (e.g., sensitive data is in same file as other data, sensitive data is metadata associated with other data, etc.). In one aspect, the slave can be a memory component that has mutually authenticated with a host. The host can receive information relating the types of tasks that the memory component has the functionality to perform, where the tasks that can be performed by the memory component can include tasks, functions, and/or operations that extend beyond conventional memory devices (e.g., extend beyond facilitating reads, writes, and erases to/from the memory). The tasks that can be performed on the data (e.g., stored data) by the memory component can be virtually any task that can be performed by the host, where the tasks assigned by the host can be based in part on the level of authentication of, or the level of rights (e.g., management rights) granted to, the memory component.

For example, the memory component can search for data (e.g., e-mails, audio files, video files, etc.) in its memory array (e.g., 104), where the search is managed and performed by the memory component, not the host; the memory component can manage printing or facilitating printing of data stored in the memory component, or processed results associated with such data, where the printing can be managed by the memory component; the memory component can perform cryptographic functions on the stored data, where the secure data (e.g., encrypted data) and the cryptographic protocol that is utilized to encrypt/decrypt the data are stored in the memory component, and the memory component can decrypt the stored data and can provide a result (e.g., decrypted data) to the host, without the host having access to the stored data or the cryptographic protocol, etc. For instance, a video file (e.g., movie) can be encrypted and stored in the memory component, and, in order to facilitate securing the video file and/or the cryptographic protocol, it can be desirable to offload the decrypting of the video file to the memory component and having the memory component perform the decryption using the cryptographic protocol, so the cryptographic protocol and/or encrypted data is not provided to the host.

In another aspect, the memory component can have some or all of the information (e.g., instructions) it desires in order to perform the task(s). In another aspect, the memory component can request the host to provide some or all of the information desired to perform the task(s).

At 804, data can be retrieved. In one aspect, the memory component can access its memory array and retrieve the desired data, which can include sensitive information, for example. At 806, the data, or a subset thereof, can be processed. In one aspect, the controller component (e.g., 106) and/or other components (e.g., cryptographic component 208) of the memory component can perform the task(s) based in part on the instructions or other information provided to the memory component by the host.

At 808, a result(s) can be determined based in part on the processing of the data. The memory component, utilizing its controller component, can execute the desired task(s) to obtain the result(s). For instance, the result(s) can be a modification of the data (e.g., decrypting, combining respective subsets of data, etc.). At 810, the result(s) can be provided. In one aspect, the memory component can transmit the result(s) obtained by performing the task(s) on the data associated with the memory component to the host. The host will only receive the result(s), and not the data (e.g., sensitive data) contained in the memory component or other data (e.g., cryptographic protocol) associated with the memory component. The result(s) provided to the host can be temporarily stored (e.g., in volatile memory) in the host, but can be securely disposed of once the result(s) is no longer desired by the host; that is, the result(s) is not saved to the hard drive or other persistent media of the host, as desired. At this point, methodology 800 can end.

Figure 9:
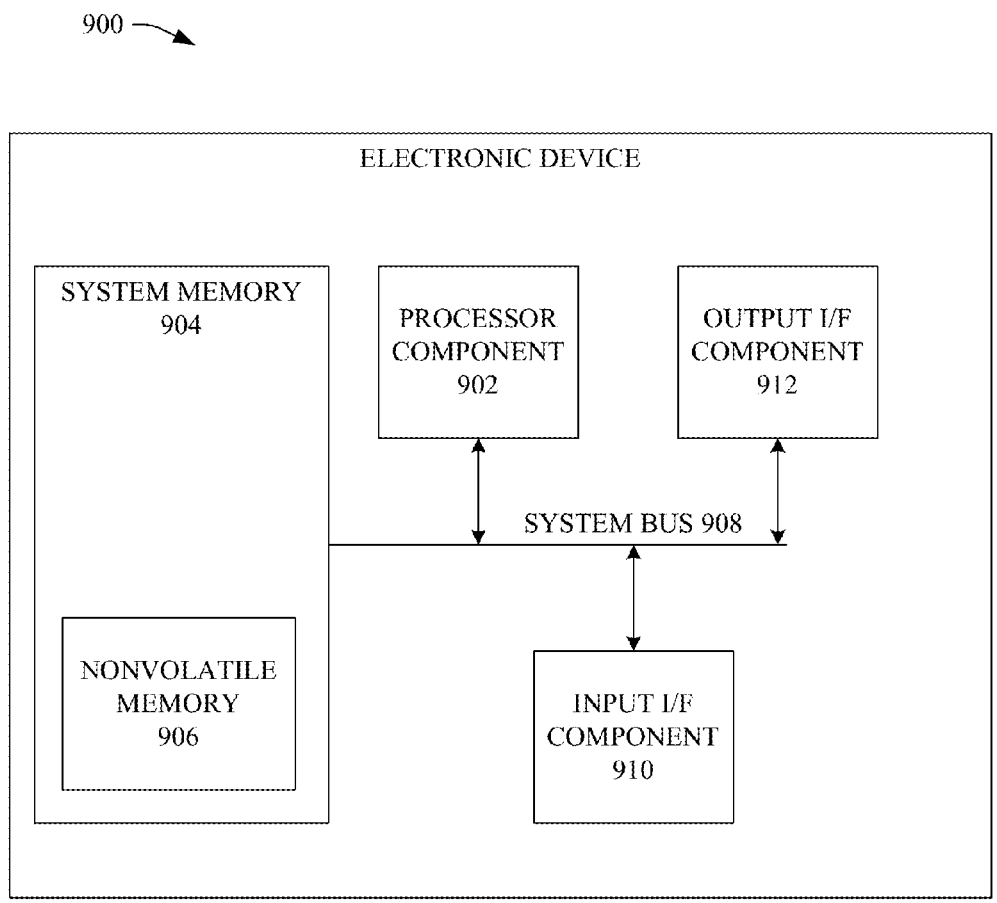
FIG. 9 is a block diagram of an exemplary, non-limiting electronic device that can employ a memory.

Referring to FIG. 9, illustrated is a block diagram of an exemplary, non-limiting electronic device 900 that can comprise and/or incorporate system 100, system 200, memory device 300, system 400, and/or system 500, or a respective portion(s) thereof. The electronic device 900 can include, but is not limited to, a computer, a laptop computer, network equipment (e.g., routers, access points), a media player and/or recorder (e.g., audio player and/or recorder, video player and/or recorder), a television, a smart card, a phone, a cellular phone, a smart phone, an electronic organizer, a PDA, a portable email reader, a digital camera, an electronic game (e.g., video game), an electronic device associated with digital rights management, a Personal Computer Memory Card International Association (PCMCIA) card, a trusted platform module (TPM), a Hardware Security Module (HSM), a set-top box, a digital video recorder, a gaming console, a navigation system or device (e.g., global position satellite (GPS) system), a secure memory device with computational capabilities, a device with a tamper-resistant chip(s), an electronic device associated with an industrial control system, an embedded computer in a machine (e.g., an airplane, a copier, a motor vehicle, a microwave oven), and the like.

Components of the electronic device 900 can include, but are not limited to, a processor component 902 (e.g., which can be and/or can include the same or similar functionality as processor component 202, as depicted in FIG. 2 and described herein), a system memory 904, which can contain a nonvolatile memory 906, and a system bus 908 that can couple various system components including the system memory 904 to the processor component 902. The system bus 908 can be any of several types of bus structures including a memory bus or memory controller, a peripheral bus, or a local bus using any of a variety of bus architectures. It is to be appreciated that the processor component 902 can be associated with and/or part of the host 108 (e.g., which is illustrated in FIG. 2 and described herein).

Electronic device 900 can typically include a variety of computer readable media. Computer readable media can be any available media that can be accessed by the electronic device 900. By way of example, and not limitation, computer readable media can comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, nonvolatile memory 906 (e.g., flash memory), or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by electronic device 900. Communication media typically embodies computer readable instructions, data structures, program modules or other data in a modulated data signal such as a carrier wave or other transport mechanism and includes any information delivery media.

The system memory 904 can include computer storage media in the form of volatile (e.g., SRAM) and/or nonvolatile memory 906 (e.g., flash memory). For example, nonvolatile memory 906 can be the same or similar, or can contain the same or similar functionality, as memory component 102 (e.g., as described herein with regard to system 100, system 200, memory device 300, system 400, system 500, etc.), where the nonvolatile memory 906 can be removable media or non-removable media. A basic input/output system (BIOS), containing the basic routines that can facilitate transferring information between elements within electronic device 900, such as during start-up, can be stored in the system memory 904. The system memory 904 typically also can contain data and/or program modules that can be accessible to and/or presently be operated on by the processor component 902. By way of example, and not limitation, the system memory 904 can also include an operating system(s), application programs, other program modules, and program data.

The nonvolatile memory 906 can be removable or non-removable. For example, the nonvolatile memory 906 can be in the form of a removable memory card or a USB flash drive. In accordance with one aspect, the nonvolatile memory 906 can include flash memory (e.g., single-bit flash memory, multi-bit flash memory), ROM, PROM, EPROM, EEPROM, or NVRAM (e.g., FeRAM), or a combination thereof, for example. Further, a flash memory can comprise NOR flash memory and/or NAND flash memory.

A user can enter commands and information into the electronic device 900 through input devices (not shown) such as a keypad, microphone, tablet, or touch screen although other input devices can also be utilized. These and other input devices can be connected to the processor component 902 through input interface component 910 that can be connected to the system bus 908. Other interface and bus structures, such as a parallel port, game port or a universal serial bus (USB) can also be utilized. A graphics subsystem (not shown) can also be connected to the system bus 908. A display device (not shown) can be also connected to the system bus 908 via an interface, such as output interface component 912, which can in turn communicate with video memory. In addition to a display, the electronic device 900 can also include other peripheral output devices such as speakers (not shown), which can be connected through output interface component 912.

It is to be understood and appreciated that the computer-implemented programs and software can be implemented within a standard computer architecture. While some aspects of the disclosure have been described above in the general context of computer-executable instructions that can be run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone), microprocessor-based or programmable consumer electronics, and the like, each of which can be operatively coupled to one or more associated devices.

The illustrated aspects of the disclosure may also be practiced in distributed computing environments where certain tasks are performed by remote processing devices that are linked through a communications network. In a distributed computing environment, program modules can be located in both local and remote memory storage devices.

As utilized herein, terms "component," "system," "interface," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein can encompass a computer program accessible from any computer-readable device, carrier, or media. For example, computer readable media can include, but is not limited to, magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
a memory that stores secure data and computer executable components; and
a processor that executes the following computer executable components stored within the memory:
an optimized controller component configured to:
in response to receiving a request, authenticate a host device associated with the memory and determine, based on the authentication of the host device, an availability of a task;
in response to determining the task is available, perform the task on the secure data to generate result data, wherein the memory stores the secure data, wherein the secure data is a subset of data other than a second subset of data that is used to access the secure data in the memory and other than a third subset of data that is used to decrypt the secure data, and wherein the host device is not permitted access to the secure data; and
transmit the result data to the host device without transmission of the secure data to the host device.

2. The system of claim 1, further comprising an authentication component that authenticates the host devices based on comparing host authentication data of the request to memory authentication data stored in the memory.

3. The system of claim 1, wherein the host device is external to the memory.

4. The system of claim 1, wherein the optimized controller component is further configured to, in response to receiving the request, transmit availability data representing the availability of the task.

5. The system of claim 1, wherein the optimized controller component is further configured to secure the secure data by storing the secure data in a portion of the memory, wherein the host device is denied access to the portion of the memory.

6. The system of claim 1, wherein the optimized controller component is further configured to instruct the host device to delete the result data from a memory component of the host device based on occurrence of a triggering event.

7. The system of claim 1, wherein the optimized controller component is further configured to determine the triggering event based on a display of the result data by the host device.

8. The system of claim 1, wherein the optimized controller component is further configured to, in response to transmitting the result data, delete the result data.

9. The system of claim 1, wherein the task relates to at least one of performing a calculation on the secure data or searching the secure data comprising a set of emails to determine an email of the set of emails that is responsive to the request, to generate the result data.

10. A method for secure data access, comprising:
employing a processor to execute computer executable components stored in an electronic memory device to perform the following acts:
receiving an operation request, from an external host device, representing a request to perform an operation on the secure data, wherein the secure data is stored in the electronic memory device and is a subset of data different from a second subset of data that is used to access the secure data in the electronic memory device and different from a third subset of data that is used to decrypt the secure data, and wherein the external host device is denied access to the secure data; and in response to the operation request, determining, based on an authentication of the external host device, whether the operation is available;

in response to determining that the operation is available, performing the operation on the secure data to generate result data; and in response to generating the result data, transmitting the result data to the external host device without transmitting the secure data to the external host device and deleting the result data from the electronic memory device.

11. The method of claim 10, further comprising:
receiving, from the external host device, an availability request representing a request to identify whether one or more operations are available.

12. The method of claim 11, further comprising:
in response to receiving the availability request, determining availability data representing availability of the one or more operations.

13. The method of claim 12, further comprising:
transmitting the availability data to the external host device.

14. The method of claim 10, further comprising:
in response to determining, based on the authentication, that the operation is not available, transmitting, to the external host device, denied access data that indicates the operation is not available.

15. The method of claim 10, wherein performing the operation to generate the result data comprises searching the secure data stored in the electronic memory device and generating the result data based on the searching.

16. The method of claim 15, wherein the secure data comprises secured message data associated with messages of a user identity, wherein the user identity is associated with the electronic memory device.

17. A host device communicatively coupled to an external memory device, the host device comprising:

a memory to store executable instructions; and
a processor, coupled to the memory, that facilitates execution of the executable instructions to perform operations, comprising:

transmitting access request data to the external memory device, wherein the request data comprises a request to identify a set of available functions associated with secure data stored in the external memory device, wherein the secure data is a subset of data other than a second subset of data that is used to access the secure data in the external memory device and other than a third subset of data that is used to decrypt the secure data;

receiving access result data, from the external memory device, that identifies the set of available functions;

selecting a function from the set of available functions;

transmitting a function request to the external memory device to facilitate execution of the selected function, of the set of available functions, on the secure data;

receiving result data representing a result of the execution of the function on the secure data without the host device receiving or being permitted access to the secure data stored in the external memory device; and disposing the result data after processing the result data.

18. The host device of claim 17, wherein disposing of the result data after processing the result data comprises removing the result data from a memory device of the host device after displaying the result data.

19. The host device of claim 17, wherein the operations further comprise:
authenticating the external memory device based on authentication data.

20. The host device of claim 19, wherein the authenticating the external memory device comprises:
transmitting host authentication data of the authentication data to the external memory device; and
receiving memory authentication data of the authentication data from the external memory device.

* * * * *